US008503568B1

United States Patent
Pheiffer et al.

(10) Patent No.: US 8,503,568 B1
(45) Date of Patent: Aug. 6, 2013

(54) DIFFERENTIAL ENCODING FOR MULTIPLEXED DATA STREAMS

(75) Inventors: Brian K. Pheiffer, Palos Verdes Estates, CA (US); Chak M. Chie, Culver City, CA (US)

(73) Assignee: The Boeing Company, Chicago, IL (US)

( * ) Notice: Subject to any disclaimer, the term of this patent is extended or adjusted under 35 U.S.C. 154(b) by 751 days.

(21) Appl. No.: 11/517,729

(22) Filed: Sep. 7, 2006

(51) Int. Cl.
*H04L 27/10* (2006.01)

(52) U.S. Cl.
USPC ............................ 375/283; 375/244; 375/330

(58) Field of Classification Search
USPC ........................ 375/283, 244, 330; 341/143
See application file for complete search history.

(56) References Cited

U.S. PATENT DOCUMENTS

| | | | | |
|---|---|---|---|---|
| 4,965,858 A * | 10/1990 | Naito et al. | ................... | 398/205 |
| 5,222,103 A * | 6/1993 | Gross | ............................ | 375/281 |
| 5,377,229 A * | 12/1994 | Wilson et al. | ................. | 375/223 |
| 5,739,783 A * | 4/1998 | Tajima | .............................. | 341/59 |
| 6,271,950 B1 * | 8/2001 | Hansen et al. | ................. | 398/154 |
| 6,295,362 B1 * | 9/2001 | Zhang | ................................ | 381/2 |
| 6,909,386 B1 * | 6/2005 | Kim et al. | ...................... | 341/111 |
| 6,909,389 B1 * | 6/2005 | Hyde et al. | ..................... | 341/144 |
| 6,934,308 B1 * | 8/2005 | Yonenaga et al. | ............ | 370/535 |
| 7,398,450 B2 * | 7/2008 | Konishi et al. | ................. | 714/772 |
| 2002/0196508 A1 * | 12/2002 | Wei et al. | ...................... | 359/183 |
| 2003/0002121 A1 * | 1/2003 | Miyamoto et al. | ............ | 359/183 |
| 2007/0115160 A1 * | 5/2007 | Kleveland et al. | ............ | 341/144 |
| 2007/0230610 A1 * | 10/2007 | Poberezhskiy | ............... | 375/279 |

* cited by examiner

*Primary Examiner* — Kenneth Lam
*Assistant Examiner* — Sung Ahn
(74) *Attorney, Agent, or Firm* — Haynes and Boone, LLP

(57) ABSTRACT

A differential encoding and decoding system and method for multiplexed data is disclosed. The multiplexed data is formed from a plurality of input data sources. The differential encoding and decoding uses a delay proportional to the number of input data streams in the plurality. In this fashion, errors that propagate from an error in one of the input data sources does not interfere with other input data sources upon de-multiplexing.

17 Claims, 3 Drawing Sheets

DIFFERENTIAL ENCODING FOR MULTIPLEXED DATA STREAMS

STATEMENT REGARDING FEDERALLY SPONSORED RESEARCH OR DEVELOPMENT

This invention was made with Government support under contract number FA8808-04-C-0022 awarded by the U.S. Air Force. The Government has certain rights in this invention.

TECHNICAL FIELD

This invention pertains to coding, and more particularly to the differential encoding and decoding of multiplexed data streams.

BACKGROUND

Binary data may be transmitted using a number of modulation schemes such as amplitude-shift keying (ASK) or phase-shift keying (PSK). In PSK modulation, a carrier signal such as cos(wt) is used to represent one binary state (either zero or one) and a phase-shifted carrier signal (such as −cos(wt)) is used to represent the remaining binary state. A PSK signal cannot be incoherently demodulated because the envelope for a sinusoid is not affected by the phase shift used to represent data. Thus, a receiver for PSK-modulated signals needs to generate a carrier that is synchronous with the received carrier so that the phase changes may be detected. A number of techniques may be used to generate the carrier signal such as through squaring the received signal. However, the resulting recovered carrier has a phase ambiguity with regard to the received signal. Because of this ambiguity, what was a logical one may be decoded as a logical zero and vice-versa. Thus, such receivers may be vulnerable to substantial errors resulting from a polarity reversal of the received data.

A differential encoding scheme protects against this polarity reversal for a received PSK signal. For example, suppose a baseband digital word is 11100100. One form of differential encoding for this word would be to encode a logical one the same as the encoding given the preceding bit and to encode a zero by the opposite of the encoding for the preceding bit. Because the initial bit has no preceding bit, the encoder will need a starting value, which may be either one or zero. If we assume the starting value is one, the baseband word 11100100 becomes 11101101. Because the transition between adjacent bits is being encoded, a PSK modulation scheme becomes immune to the phase ambiguity in the recovered carrier signal. Thus, differential encoding schemes are immune to the polarity reversal problem discussed above. It may be observed that in a PSK-modulated signal where a given bit is transmitted as +/−1 times a carrier signal, the preceding bit may be considered as a carrier with a possible phase ambiguity of 180 degrees. This fact has been exploited in differential PSK (DPSK). In a DPSK receiver, the received signal is multiplied with a version of the received signal delayed by a bit period. The product of this multiplication may then be low-pass filtered. Given the preceding differential encoding scheme (in which a one is encoded the same as the preceding bit whereas a zero is encoded oppositely to that used for the preceding bit), the output of the low-pass filtering will be positive if a logical one is received and negative if a logical zero is received. The robust performance yet simple implementation for differential encoding schemes such as DPSK has lead to its widespread use.

Differential encoding may be used in high-speed digital communication links such as 10 gigabit Ethernet links. A transmission speed of 10 Giga-bits per second is too fast for conventional copper-based links such that it is conventional to use an optical fiber in 10 gigabit Ethernet links. However, the photonic signals in the optical fiber must be converted back into electrical impulses so that the information may be decoded. Because copper-based links cannot typically accommodate a 10 gigabit signal, the photonic signal may be demultiplexed into four 3.125 Giga-bit links such as practiced in the XAUI protocol. Thus, it is common to multiplex a plurality of relatively low-speed input signals into a single high-speed serial signal. A generic multiplexed transmission system with differential encoding is illustrated in FIG. 1. Four input data streams $X_1$ through $X_4$ are multiplexed in a 4:1 multiplexer 100 to form a serial data multiplexed data stream Y. Data stream Y is differentially encoded using, for example, an XOR gate 105 and a one-bit-period (T) delay circuit 110 to form an encoded data stream $Y_{ENCODED}$. Encoded data stream $Y_{ENCODED}$ transmits across a serial data link (which may be a wireless link or may comprise a transmission line such as a fiber optic link) to be decoded using, for example, another one-bit-period (T) delay circuit 115 and another XOR gate 120 to retrieve data stream Y. Data stream Y is then demultiplexed in a 4:1 demultiplexer 125 so that four output data streams $X_1$ through $X_4$ may be produced. Because of noise or other interferences, a bit in one of the input data streams $X_1$ through $X_4$ may be corrupted before multiplexing in multiplexer 100. This corrupted bit will then produce an error in an adjacent bit in the encoded data stream $Y_{ENCODED}$ because of the differential encoding. The encoded data stream $Y_{ENCODED}$ will thus have two corrupted bits due to the single bit error. When demultiplexed, each of the adjacent bit errors will be placed in its own output word. For example, one error might be in the $X_1$ output data stream whereas the formerly-adjacent bit error is then placed in the $X_2$ output data stream. Thus, a single erroneous word carried in an input data stream becomes two erroneous words in the output data streams.

Accordingly, there is a need in the art for multiplexed differentially encoded data transmission having a lower bit error rate.

SUMMARY OF THE INVENTION

In accordance with an embodiment of the invention, a transmitter is provided that includes: a multiplexer adapted to multiplex a plurality of input data streams into an output data stream; and a differential encoder adapted to differentially encode the output data stream using a delay proportional to the number of input data streams in the plurality to provide an encoded data stream.

In accordance with another embodiment of the invention, a receiver is provided that includes: a differential decoder adapted to decode an modulated carrier signal according to a differential encoder delay to provide a decoded modulated carrier signal; a demodulator adapted to demodulate the decoded modulated carrier signal to provide a decoded signal; and a demultiplexer adapted to demultiplex the decoded signal into a plurality of output data streams, wherein the differential encoder delay is proportional to the number output data streams in the plurality.

In accordance with another embodiment of the invention, a method of communication is provided that includes: multiplexing a plurality of input data streams to provide an multiplexed data stream; and differentially encoding the multiplexed data stream using a delay proportional to the number of input data streams in the plurality to provide an encoded multiplexed data stream.

A better understanding of the above and many other features and advantages of present invention may be obtained from a consideration of the detailed description below of some exemplary embodiments thereof, particularly if such consideration is made in conjunction with the appended drawings, wherein like reference numerals are used to identify like elements illustrated in one or more of the figures therein.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
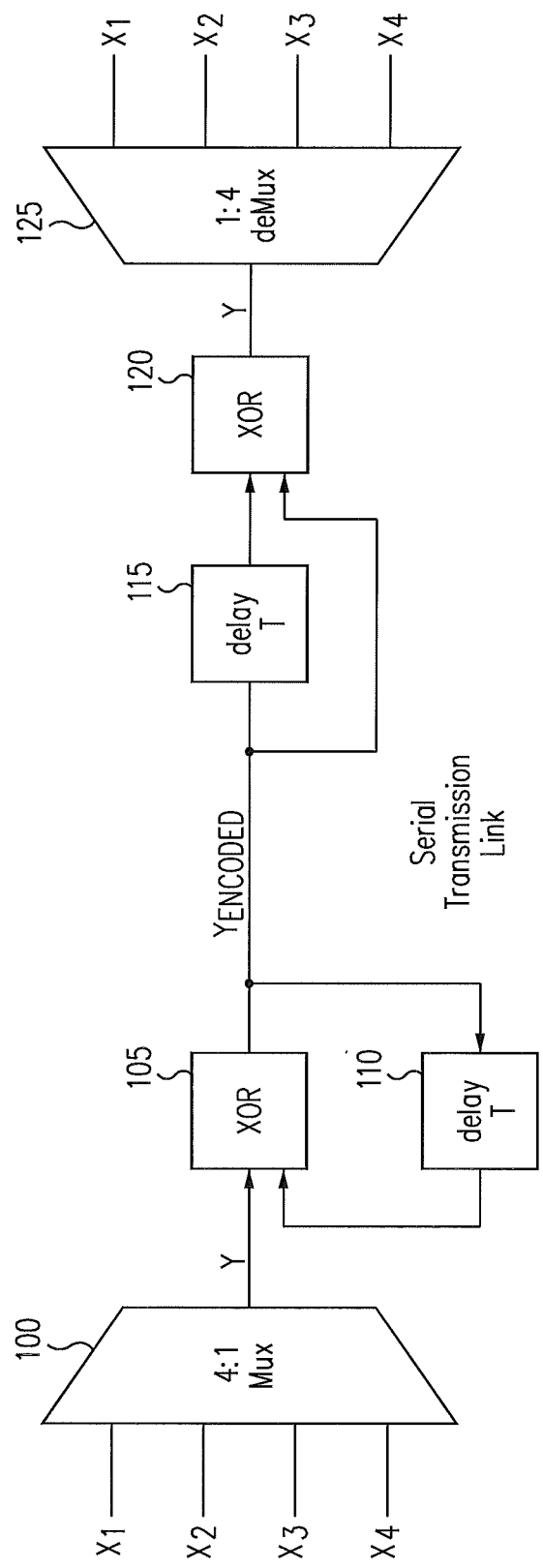
FIG. 1 is a diagram of a conventional differential encoder for a multiplexed input data stream and a corresponding differential decoder.

In addition to differential encoding, data transmission is assisted by the introduction of redundancy. Although the introduction of redundancy slows the overall data transmission speed, the redundant data allows for error detection and even error correction. Indeed, a symbol-based code such a Reed-Solomon code can correct for burst errors such as if two or more adjacent bits within a word are in error. Thus, a differential encoding transmission scheme is provided that provides de-multiplexed data from multiplexed input data streams such that a bit error in one of the input data streams results in two-adjacent bit errors in a single one of the de-multiplexed output data streams. Should symbol-based error correction be implemented, the resulting output word with two adjacent bit errors may be corrected with substantially the same success as if just one bit were introduced into the word. In this fashion, a substantial improvement in error reduction is achieved as compared to a conventional differential encoding scheme such as discussed with regard to FIG. 1.

Figure 2:
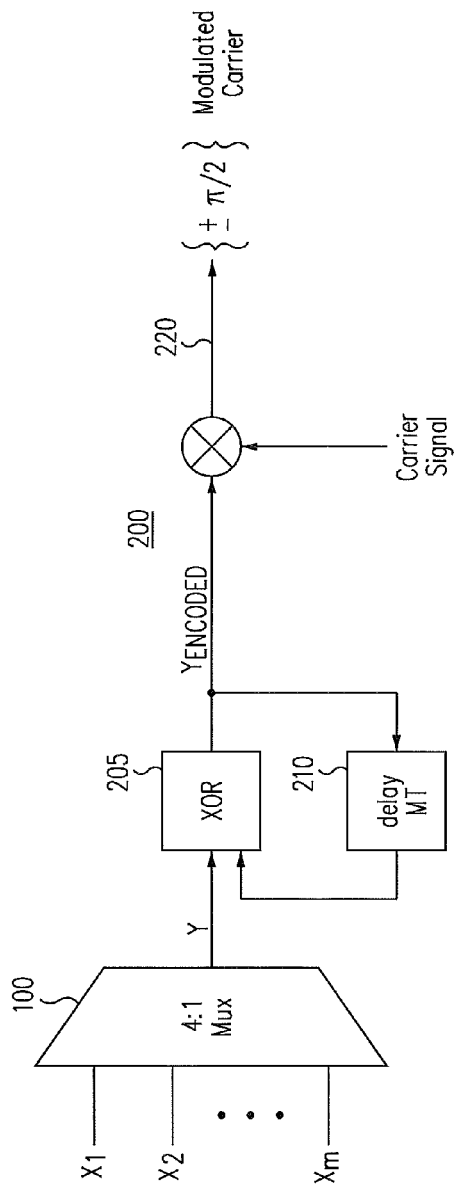
FIG. 2 is a diagram of a multiplexer, differential encoder, and a modulator according to an embodiment of the invention.

To keep the plural bit errors resulting from a bit error in an input data word within a single output data word, the differential encoding and decoding uses a delay that matches the number of input data streams being multiplexed. For example, if four input data streams are being multiplexed, a delay of four bit periods (4T) may be used. In other embodiments, the delay may be an integer multiple of the number of input data streams being multiplexed. Turning now to FIG. 2, a multiplexer, differential encoder, and modulator circuit 200 is illustrated. A plurality of M input data streams $X_1$ through $X_M$ are multiplexed at a M:1 multiplexer 200 to form an serial data stream Y. Data stream Y is differential encoded using an XOR gate 205 and a delay circuit 210. Delay circuit 210 introduces a delay that is proportional to the integer number M of input data streams. For example, the delay may equal M*T, where T is the bit period for the multiplexed data stream. More generally, the delay may equal an integer multiple of M such as 2M, 3M, and so on. The resulting differentially-encoded data stream $Y_{ENCODED}$ will be encoded such that bits originating from a given input data streams are only encoded with bits from the same input data stream. As will be explained further, this type of encoding ensures that errors in a given input data stream will propagate only to its corresponding output data stream. A carrier signal is modulated with the encoded data stream $Y_{ENCODED}$ to form a modulated carrier signal 220. For example, a modulated sinusoidal carrier signal 220 may have a phase of $\pi/2$ or $-\pi/2$ depending upon the binary value of encoded data stream $Y_{ENCODED}$.

Figure 3:
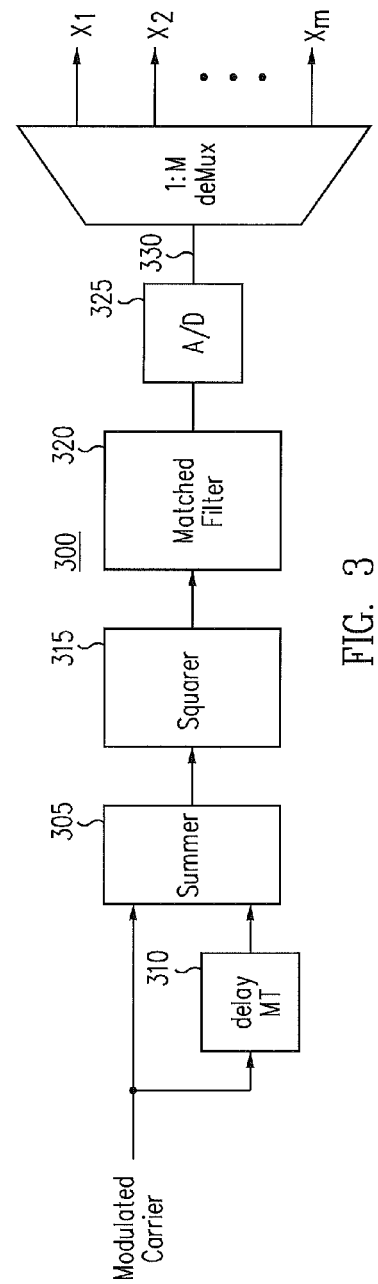
FIG. 3 is a diagram of a differential decoder, demodulator, and demultiplexer according to an embodiment of the invention.

A corresponding differential encoder, demodulator, and demultiplexer circuit 300 is illustrated in FIG. 3. The modulated carrier signal from circuit 200 is added in an adder 305 with an M*T-delayed version of the modulated carrier signal from a delay circuit 310. The resulting summation signal from adder 305 is then squared in a squaring circuit 315, filtered in a matched filter 320, and digitized in an analog-to-digital converter (ADC) 325 to provide a demodulated digital signal 330. A 1:M demultiplexer 335 receives the de-modulated signal to recover the M output data streams $X_1$ through $X_M$.

The advantageous results achieved by differential encoding and decoding shown in FIGS. 2 and 3 may be better understood with regard to a specific example. For example, suppose the integer number M of input data streams being multiplexed is two, which may be designated as input data streams $X_1$ and $X_2$. The delay circuits 210 and 310 of FIGS. 2 and 3 would thus introduce delays of 2 T, where T is the bit period for the multiplexed data stream. Should the input stream $X_1$ provide a word A1 B1 C1 while the input stream $X_2$ provides a word A2 B2 C2, the resulting multiplexed data stream Y (referring back to FIG. 2) would be A1 A2 B1 B2 C1 C2 and so on. After decoding, demodulating, and de-multiplexing, the original words A1 B1 C1 and A2 B2 C2 are recovered for output data streams $X_1$ and $X_2$, respectively. If the input bit A1 is presumed to be in error in the input data stream $X_1$, the resulting demultiplexed output word in the output data stream will have an error in both the A1 and B1 bit positions. In contrast, a conventional system such as discussed with regard to FIG. 1 would provide an error for bit A1 and also an error in the $X_2$ output data stream for bit A2.

The advantage of the disclosed encoding scheme may be readily observed should the words be symbol-encoded using an error correction code such as Reed-Solomon. The error rate in a symbol-based error correction is not linearly dependent on the number of bits within a symbol that are erroneous. Thus, providing an output word with two bit errors will have virtually the same error rate after correction as would be the case for an output word with a single bit error. However, a conventional one-bit-period-delay differential encoding scheme would have two output words with single bit errors, which results in an error rate after correction approximately twice what the error rate is for a delay-made-proportional-to-the-number-of-multiplexed-data-streams differential encoding scheme as discussed herein. It is believed that the enhanced error performance results in an effective increase of the signal-to-noise ratio (SNR) of 0.3 dB. This increase in SNR is substantial, particularly for fading environments.

Figure 4:
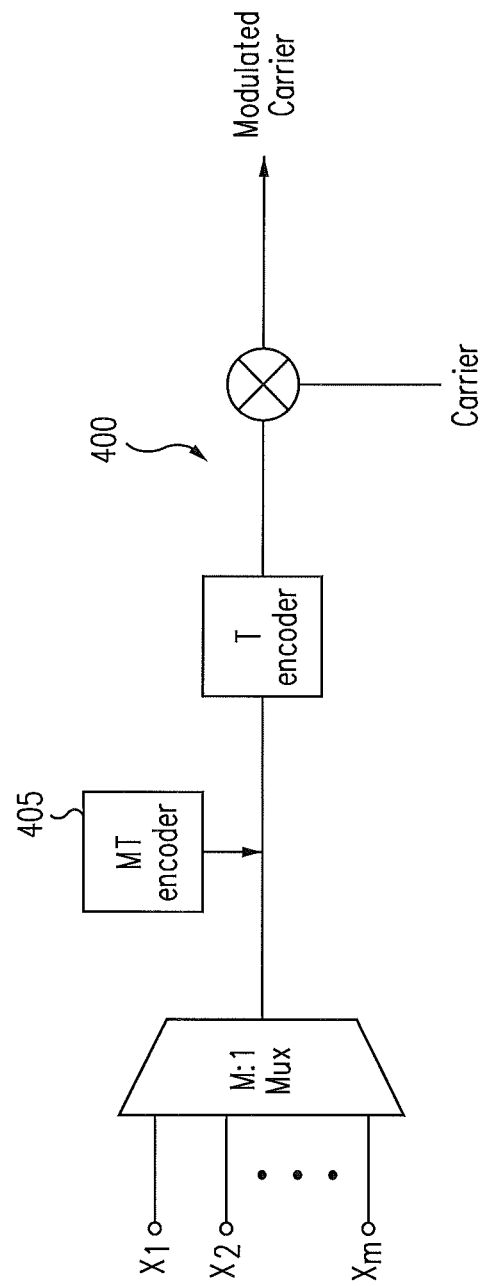
FIG. 4 is a diagram of a conventional transmitter being modified to practice differential encoding with a delay proportional to the number of input data streams without discarding the existing differential encoder according to an embodiment of the invention.

Because the use of one-bit-period-delay differential encoders and decoders is an entrenched practice, systems that employ such encoding may be modified to practice a proportional delay scheme without discarding their one-bit encoders and decoders. For example, a conventional one-bit-period multiplexer, encoder and modulator 400 and a one-bit-period decoder are illustrated in FIG. 4 for a system receiving M input data streams $X_1$ through $X_M$. This system could be modified by inserting a differential encoder 405 that uses a delay of MT (where T is the bit period for the multiplexed data stream) between the multiplexer and the one-bit differential encoder. A similar modification could be performed on a conventional decoder, demodulator, and de-multiplexer.

It will be appreciated that other forms of modulation may be used to provide the modulated carrier discussed with regard to FIGS. 2 and 3. In that regard, those of skill in this art will appreciate that many modifications, substitutions and variations can be made to the materials, apparatus, configurations and methods of the present invention without departing from its spirit and scope. Accordingly, the scope of the present invention should not be seen as limited to the particular embodiments illustrated and described herein, as they are merely exemplary in nature, but rather, should be fully commensurate with that of the claims appended hereafter and their functional equivalents.

What is claimed is:

1. A transmitter, comprising:
  a multiplexer adapted to multiplex a plural integer number M of input data streams into an output data stream having a bit period T; and
  a differential encoder adapted to differentially encode the output data stream using a delay equal to a product of the bit period T times the plural integer number M to provide an encoded data stream, wherein the encoded data stream is transmitted over a faster link than the input data streams, and wherein the input data streams are symbol-encoded with an error correction code, and wherein the plural integer number M is an integer number greater than two.

2. The transmitter of claim 1, further comprising:
  a modulator adapted to modulate a carrier signal with the encoded data stream to provide a modulated carrier signal.

3. The transmitter of claim 2, wherein the modulator is a differential phase-shift-keyed (DPSK) modulator.

4. The transmitter of claim 1, wherein the differential encoder comprises:
  a delay circuit adapted to provide a delayed version of the output data stream delayed by the delay; and
  an XOR gate adapted to process the output data stream and the delayed version of the output data stream to provide the encoded data stream.

5. The transmitter of claim 1, wherein the error correction code is a Reed-Solomon code.

6. A receiver, comprising:
  a differential decoder adapted to decode a modulated carrier signal having a bit period T according to a single differential encoder delay to provide a decoded modulated carrier signal;
  a demodulator adapted to demodulate the decoded modulated carrier signal to provide a decoded signal; and
  a demultiplexer adapted to demultiplex the decoded signal into a plural integer number M of output data streams, wherein the single differential encoder delay is equal to a a product of the bit period T times the plural integer number M, and wherein the decoded signal is received over a faster link than the output data streams, and wherein each output data stream is symbol-encoded with an error correction code, and wherein the plural integer number M is any integer number greater than two.

7. The receiver of claim 6, further comprising: an analog-to-digital converter adapted to digitize the decoded signal.

8. The receiver of claim 6, wherein the differential decoder comprises:
  a delay circuit adapted to provide a delayed version of the modulated carrier signal; and
  an adder adapted to sum the modulated carrier signal and the delayed version of the modulated carrier signal to provide the decoded modulated carrier signal.

9. The receiver of claim 6, wherein the demodulator is a non-coherent demodulator.

10. The receiver of claim 9, wherein the non-coherent demodulator comprises a squaring circuit and a matched filter.

11. A method of communication, comprising:
  multiplexing a plurality of M input data streams to provide a multiplexed data stream having a bit period T; and
  differentially encoding the multiplexed data stream using a delay equal to M*T to provide an encoded multiplexed data stream, wherein the encoded multiplexed data stream is transmitted over a faster link than the input data streams, and wherein the input data streams are symbol-encoded with an error correction code, and wherein the number of input data streams M is any integer number greater than two.

12. The method of claim 11, further comprising modulating a carrier signal with the encoded multiplexed data stream to provide a modulated carrier signal.

13. The method of claim 12, wherein the modulated carrier signal is an electrical signal.

14. The method of claim 12, wherein the modulated carrier signal is an optical signal.

15. The method of claim 12, further comprising:
  differentially decoding the modulated carrier signal using the delay to provide a decoded modulated carrier signal.

16. The method of claim 15, further comprising demodulating the decoded modulated carrier signal to provide a decoded signal.

17. The method of claim 16, further comprising: de-multiplexing the decoded signal into a plurality of output signals having symbol-encoded error correction.

* * * * *